Jan. 1, 1963   J. D. MOZIC   3,070,958
PROGRAMMED OUTPUT ENERGY SOLID FUEL GAS GENERATOR
Filed June 8, 1959
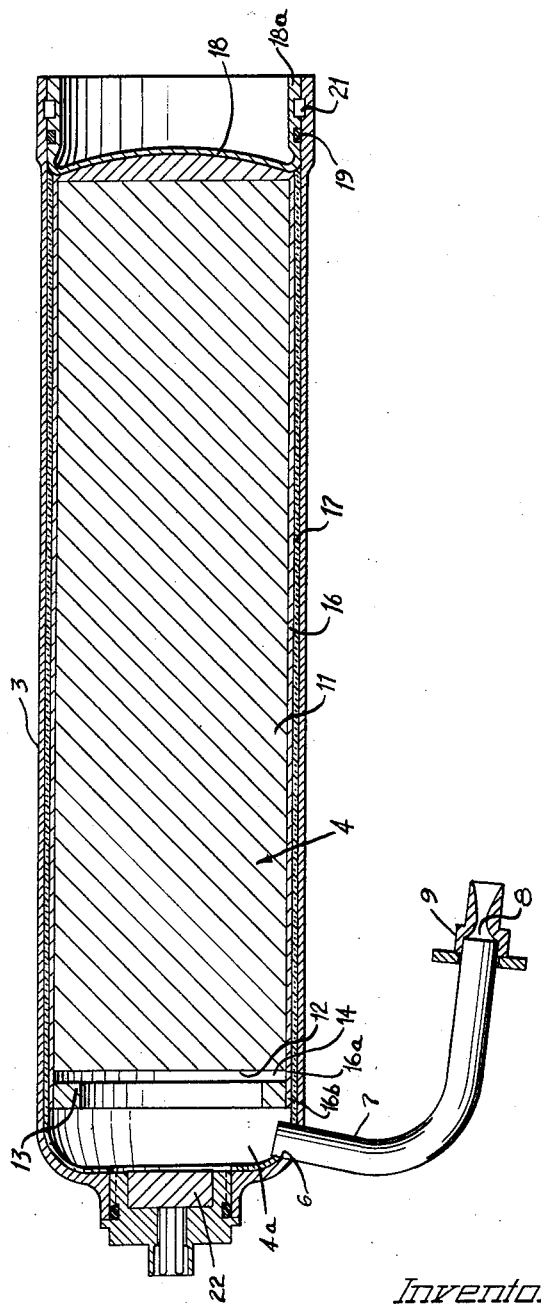
Inventor
JOSEPH D. MOZIC United States Patent Office 3,070,958
Patented Jan. 1, 1963

3,070,958
PROGRAMMED OUTPUT ENERGY SOLID FUEL GAS GENERATOR
Joseph D. Mozic, Cleveland, Ohio, assignor to Thompson Ramo Wooldridge Inc., Cleveland, Ohio, a corporation of Ohio
Filed June 8, 1959, Ser. No. 818,603
4 Claims. (Cl. 60—39.47)

The present invention relates to improvements in a gas generator for burning solid propellants and providing a programmed output of energy.

The present invention particularly relates to a gas generator for driving auxiliary power units such as those supplying electrical and hydraulic power for missiles and other rocket applications. In these uses, a flow of operating gas is delivered to a turbo alternator or a turbo-hydraulic pump which are powered by the gas or energy output of a solid fuel gas generator. An object of the present invention is to provide a solid fuel gas generator which provides a two-stage or dual level of energy output with an initial stage or boost level of a relatively high energy output to accelerate turbo-machinery to operating speed in a very short time, and a second stage output or a steady-stage output for maintaining the machinery at the desired steady-state energy level.

Another object of the invention is to provide a solid fuel gas generator in accordance with the above object wherein the transmission from the boost phase to the steady-state phase may be precisely controlled in time so as to apply the boost energy for a sufficient time to produce the desired acceleration, but no longer than necessary so as not to saturate or exceed the energy absorbing capability of the machinery.

A further object of the invention is to provide a solid fuel gas generator having a boost phase which, upon completion of the boost stage of operation does not produce any after-effects on the steady-stage of operation.

Another object of the invention is to provide an improved method, and structure of a propellant charge combined within a gas generator chamber.

In a preferred embodiment the invention contemplates the provision of a cylindrically shaped solid fuel gas generator metal container. A gas outlet opening is provided in the burning end of the chamber with a conduit having a passageway for conducting the burning gases to a power unit such as the turbine. Within the chamber is an end-burning or "cigarette burning" propellant with the radial burning face facing the burning end of the chamber. Spaced from the burning face with a pressure equalizing undercut therebetween is a radial burning annular boost ring formed of propellant. A layer of inhibitor surrounds the main charge of propellant and the boost ring charge of propellant and is continuous and a layer of insulation is provided between the inhibitor and the container wall. An igniter and squib is positioned in the burning end for substantially simultaneously igniting the burning face of the main charge of propellant and the ring of boost propellant.

Objects and advantages other than those recited above will become more apparent to those skilled in the art with the teaching of the principles of the invention in connection with the disclosure of the preferred embodiment thereof in the specification, claims and drawing, in which:

The drawing is a sectional view showing in detail the construction of the generator for burning solid propellant and in accordance with the present invention.

As shown on the drawing:

The structure of the preferred embodiments as illustrated includes a steel tank 3 which is cylindrical in shape and has a cylindrical chamber 4 therein. The chamber is provided with a gas outlet opening 6 to which is connected a conduit 7 with a passage 8 therethrough leading to a fitting 9 for connecting to a gas powered unit such as an auxiliary turbine.

Within the gas containing chamber 4 is a main propellant charge 11 that is cylindrical in shape and has a radial burning face 12 which faces an ignition or burning end 4a of the chamber. The burning face is spaced from the gas outlet 6 and the main propellant charge 11 burns axially from the burning face 12. The propellant is referred to as a "cigarette burning" propellant and is so termed because it burns in a manner similar to the cigarette at a substantially uniform rate. The burning of the main propellant charge 11 provides the steady-stage phase of operation for producing gas for steady state operation of gas operated turbine or other auxiliary power unit. The boost phase is provided by an annular ring 13 of radial burning propellant. The ring 13 is separated from the burning face 12 of the main charge of propellant by pressure equalizing undercut 14.

The main charge 11 and boost charge 13 preferably are formed of the same propellant material. A solid propellant is used which is preferably a compounded propellant, that is, a mechanical mixture of a fuel and oxidizing agent or in some instances may be a monopropellant. Solid fuels of a composite type are available commercially and the fuel employed may be, for example, a composite type solid fuel using a synthetic rubber for fuel intermixed with ammonium nitrate which acts as the oxidizer during the burning of the fuel. Other types of oxidizers may be employed such as ammonium perchlorate or potassium perchlorate. Fuels known to the art as "doublebase" fuels which are essentially a mixture of nitrocellulose and nitrogylcerin may also be employed. In a typical composition of a composite ammonium nitrate propellant, the material may contain 79.29% ammonium nitrtae, 19.88% rubber type binder, and 0.83% burning rate catalyst. In summary, the features of the invention are adapted to utilization in a system employing a solid type fuel source in which the energy rate is a function of the area of fuel being burned.

The propellant (fuel plus oxidizer) has a characteristic such that the main charge 11 of propellant burns at a uniform rate at substantially constant pressure in layers perpendicular to the axis of the charge. The propellant charge is bonded to the wall of the container 3 with a flexible sealing material or liner which allows the main propellant charge the freedom of motion it requires for adapting its shape to the deformation produced by the gas pressure, thermal expansion differences and internal stress. The liner of material is selected on the basis of adherence to the propellant, non-burning characteristics, and elastic properties. The liner is illustrated as including a grain inhibitor 16 surrounding the outside and one end of the main propellant and surrounding the boost propellant ring 13, and an outer layer of insulation 17. The insulation extend cylindrically along the inner surface of the wall of the container 3. The inhibitor 16 is positioned inside the insulation and surrounds the main charge 11 and extends continuously across the pressure equalizing undercut gap 14 at 16a and extends around the boost propellant ring 13 at 16b. With this construction, the inhibitor remains in one piece and the portion of the inhibitor outside of the boost propellant ring remains attached and fixed to the body of the inhibitor surrounding the end burning main propellant charge 11, thus preventing pieces of inhibitor from becoming loose and possibly clogging the hot gas passage 8, a situation which usually results in the explosion of the container.

The main charge 11 of propellant and the boost ring propellant 13 with the inhibitor layer and the insulation layer may be loaded into the container by removing a circular end wall 18. The end wall 18 has an outwardly extending flange 18a provided with an annular groove for a sealing O-ring 19, and provided with a recess for receiving a locking key 21.

At the burning end 4a of the chamber 4 is positioned an igniter and squib 22. This may be electrically operated and formed of black powder or other suitable material as will be appreciated by those skilled in the art. The matter is so positioned that it substantially simultaneously ignites the burning face 12 of the main propellant charge 11 and the exposed surfaces of the boost propellant ring 13. The undercut 14 permits burning across the entire end face 12 simultaneous with the burning of the boost ring. The boost ring will provide a rapid generation of gas at the start to accelerate the turbo-machinery to operating speed in a very short time.

The propellant construction of the main charge and boost charge 13 may be formed in various ways and in a preferred embodiment may be originally formed as a single cylinder. A circular center area is machined out of the cylindrical unit to form an exposed radial burning face of the main propellant charge 11. The undercut groove 14 is then machined to extend outwardly to the inhibitor leaving the annular ring of propellant on the inhibitor separated axially by the groove 14 from the full burning face 12 of the main charge.

The undercut groove 14 prevents stresses which would be likely to occur at the location of the boundary between two burning faces if the boost ring were attached to the mass of the main charge 11 of propellant. These stresses could result in cracks developing in the main propellant mass which could develop an uncontrolled burning area leading to gas generator failure. Thus one effect of the undercut is preventive in nature and serves to increase the reliability of the gas generator.

Another effect of the undercut groove 14 is to expose an entire radial burning face of the end burning main propellant charge 11 so that the entire end surface is free to ignite and continue to burn uniformly throughout the boost phase and to continue on into the steady-state phase. No transition in burning surface occurs in the end burning propellant, and thus the boost phase does not interfere with the steady-state burning characteristic and does not produce any undesirable effects as would be the case if the boost ring were attached to the main propellant charge.

As a summary of operation, the container 3 is loaded with the main charge 11 of propellant and the annular ring 13 of boost propellant. The two charges are located within the continuous layer of inhibitor 16. The operation of the generator is started by firing the igniter 22 which simultaneously ignites the radial burning boost ring 13 and the radial face 12 of the axial burning main charge. An initial high level output is provided by the combined burning of the boost ring propellant 13 and the main charge propellant 11 to bring an auxiliary power turbine driven by the generator gas up to speed, and when the boost ring is consumed, the main charge will continue to burn uniformly in an axial direction during the steady-state normal operation.

Thus it will be seen that I have provided an improved solid fuel gas generator having a programmed output which meet the objectives and advantages hereinbefore set forth. The mechanism is simple and reliable in operation and eliminates disadvantages of arrangements heretofore used.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A gas generator for burning a solid propellant at a programmed rate comprising an elongated tubular hollow container having an outer circumferential wall and end walls forming a burning chamber therein having first and second ends, a gas discharge opening in the container communicating directly with the first end of the chamber, the second end being closed, an annular boost ring charge of propellant positioned at said first end extending around the inner surface of the circumferential wall of the container and exposed on its axial surfaces and its inner circumferential surface for simultaneous burning of said surfaces, said first end being open and free of obstructions for a direct flow of gases from the boost ring to the discharge opening, a solid main charge of end burning propellant within the container free from interior burning passages completely filling the second end of the container and having a radial exposed end burning face at the first end of the container and being spaced axially from said annular ring of boost propellant, said boost charge ring formed of the same material as said main charge for uniform rapid burning to provide an initial boost flow of gases out through said opening, and an igniter positioned in said first end so that the boost propellant and radial face of the main propellant will ignite simultaneously with the boost propellant building up an initial pressure and the burning gases flowing directly out through the discharge opening and the main propellant burning axially solely across its radial exposed end burning face.

2. A gas generator for burning a solid propellant at a programmed rate comprising an elongated tubular hollow container having an outer circumferential wall and end walls forming a burning chamber therein having first and second ends, a gas discharge opening in the container communicating directly with the first end of the chamber, the second end being closed, an annular boost charge ring of propellant positioned at said first end extending around the inner surface of the circumferential wall of the container, said first end being open and free of obstructions for a direct flow of gases from the boost ring to the discharge opening, a solid main charge of end burning propellant within the container free from interior burning passages completely filling the second end of the container and having a radial exposed end burning face at the first end of the container and being spaced axially from said annular ring of boost propellant, said boost charge ring formed of the same material as said main charge and having axial side surfaces extending in radial planes and having an inner cylindrical surface, said ring surfaces exposed for simultaneous burning to provide an initial boost flow of gases out through said opening, and an igniter positioned in said first end so that the boost propellant and radial face of the main propellant will ignite simultaneously with the boost propellant building up an initial pressure and the burning gases flowing directly out through the discharge opening and the main propellant burning axially solely across its radial exposed end burning face.

3. A gas generator for burning a solid propellant at a programmed rate comprising in combination an elongated tubular hollow container having an outer circumferential wall and end walls and forming a burning chamber therein having first and second ends, a gas discharge opening in the container communicating directly with the first end of the chamber, the second end being closed, an annular boost charge ring of propellant positioned at said first end extending around on the inner surface of the circumferential wall of the container, said first end being open and free of obstructions for a direct flow of gases from the boost ring to the discharge opening, a solid main charge of end burning propellant within the container free from interior burning passages completely filling the second end of the container and having a radial exposed end burning face at the first end of the container spaced axially from said annular boost ring of boost propellant, said boost charge ring and said main charge being of the same material, a layer of insulating material positioned against the inner surface of the container and surrounding the boost propellant ring and main charge, a continuous layer of inhibitor material covering the inner surface of the layer of insulating material and positioned between the insulating material and the boost propellant ring and main charge, said boost ring mounted on the inhibitor layer and having its axial side surfaces and inner circumferential surface exposed for simultaneous burning, and an igniter positioned in said first end so that the boost propellant and radial face of the main propellant will ignite simultaneously with the boost propellant building up an initial pressure and the burning gases flowing directly out through the discharge opening and the main propellant burning axially solely across its radial exposed end burning face.

4. A gas generator for burning a solid propellant at a programmed rate comprising an elongated tubular hollow container having an outer circumferential wall and end walls forming a burning chamber therein having first and second ends, a gas discharge opening in the container communicating directly with the first end of the chamber, the second end being closed, an annular boost charge ring of propellant positioned at said first end extending around on the inner circumferential wall of the container and exposed for burning on its axial side surfaces and on its inner peripheral surface for simultaneous burning of the surfaces, said first end being open and free of obstructions for a direct flow of gases from the boost ring to the discharge opening, a solid main charge of end burning propellant within the container free from interior burning passages completely filling the second end of the container and having a radial exposed end burning face at the first end of the container spaced from said annular ring of boost propellant, a continuous layer of inhibitor material covering the inner surface of the container and surrounding the boost charge ring, said boost charge ring formed of the same material as said main charge with said ring and said end burning face of the main charge formed by removing material from the end of a cylindrical mass of propellant within the inhibitor layer forming a radial surface extending to the edge of the mass to separate the ring from the main charge with the ring supported by the inhibitor, said inhibitor layer being of substantially uniform thickness and being uninterrupted to prevent pieces breaking off with burning of the boost propellant ring and burning of the main charge, and an igniter positioned in said first end so that the boost propellant and radial face of the main propellant will ignite simultaneously with the boost propellant building up an initial pressure and with the burning gases flowing directly out through the discharge opening and the main propellant burning axially solely across its radial exposed end burning face.

References Cited in the file of this patent

UNITED STATES PATENTS

| | | |
|---|---|---|
| 2,667,837 | Musser et al. | Feb. 2, 1954 |
| 2,779,281 | Maurice et al. | Jan. 29, 1957 |
| 2,872,870 | Gey | Feb. 10, 1959 |
| 2,877,709 | Duckworth | Mar. 17, 1959 |
| 2,977,879 | Rice | Apr. 4, 1961 |